United States Patent
Cheng

(10) Patent No.: US 7,715,511 B2
(45) Date of Patent: May 11, 2010

(54) PACKET FRAME SYNCHRONIZATION FOR MIMO SYSTEM WITH CYCLIC SHIFT SPATIAL STREAMS

(75) Inventor: Po-Yuen Cheng, San Jose, CA (US)

(73) Assignee: Mediatek USA Inc., San Jose, CA (US)

( * ) Notice: Subject to any disclaimer, the term of this patent is extended or adjusted under 35 U.S.C. 154(b) by 672 days.

(21) Appl. No.: 11/624,705

(22) Filed: Jan. 19, 2007

(65) Prior Publication Data

US 2008/0175337 A1 Jul. 24, 2008

(51) Int. Cl.
*H04L 7/00* (2006.01)
*H04J 3/06* (2006.01)
(52) U.S. Cl. .................. 375/368; 375/365; 370/512
(58) Field of Classification Search ............ 375/316, 375/340, 342, 343, 354, 365, 368; 370/503, 370/510, 512–514; 702/124
See application file for complete search history.

(56) References Cited

U.S. PATENT DOCUMENTS

| 6,476,743 | B1 * | 11/2002 | Brown et al. ............... 341/123 |
| 2004/0052314 | A1 * | 3/2004 | Copeland ................... 375/296 |
| 2007/0104297 | A1 * | 5/2007 | Gorday ....................... 375/343 |
| 2008/0002797 | A1 * | 1/2008 | Raman et al. ............... 375/355 |
| 2008/0074308 | A1 * | 3/2008 | Becker et al. .............. 342/120 |

\* cited by examiner

*Primary Examiner*—Young T. Tse
(74) *Attorney, Agent, or Firm*—Thomas, Kayden, Horstemeyer & Risley

(57) ABSTRACT

A frame synchronization method is disclosed. The method comprises correlating a stream with a pattern to generate a correlated result c(t). A first peak and a second peak are selected from the correlated result c(t), wherein the first peak is the peak with highest amplitude, and the second peak is the peak occurring later than the first peak with the second highest amplitude. The peak ratio of the two peaks is computed, and the position of the frame boundary is determined according to the ratio.

12 Claims, 7 Drawing Sheets

| Number of Tx chains | cyclic shift for Tx chain 1 | cyclic shift for Tx chain 2 | cyclic shift for Tx chain 3 | cyclic shift for Tx chain 4 |
|---|---|---|---|---|
| 1 | 0ns | — | — | — |
| 2 | 0ns | -200ns | — | — |
| 3 | 0ns | -100ns | -200ns | — |
| 4 | 0ns | -50ns | -100ns | -150ns |

FIG. 1 (PRIOR ART)

PACKET FRAME SYNCHRONIZATION FOR MIMO SYSTEM WITH CYCLIC SHIFT SPATIAL STREAMS

BACKGROUND OF THE INVENTION

Field of the Invention

The invention relates to the field of wireless data transmission, and, more particularly, to methods and apparatuses for synchronizing a multiple-input/multiple-output (MIMO) wireless communication system with cyclic shift spatial streams.

In a wireless communication system, a receiver must synchronize the frame boundary in order to achieve good performance, particularly in an 802.11a/g system utilizing OFDM techniques. The next generation of the Wi-Fi standard, 802.11n, transmits multiple spatial streams to increase the data throughput and performance. In some cases, the preamble of 802.11n is as same as the preamble of 802.11a. When transmitting and receiving with multiple antennas, however, the receiving end suffers undesirable beam forming if every antenna transmits the same signal. Thus, in 802.11n, the preambles transmitted by different antennas are shifted cyclically. FIG. 1 shows an 802.11n system implementing cyclic shifts in differently transmitted spatial streams. Frame synchronization becomes complicated due to the use of multiple cyclically shifting streams. This cyclic shift effect, combined with multi-path interference, makes frame synchronization a more challenging problem.

Conventional frame synchronization schemes with correlation technique usually result in poor performance in MIMO systems with cyclically shifting transmission streams. Performance is particularly poor when multi-path interference is considered. Combining the cyclic shift effects and multi-path interference effects, the system will have difficulty in deciding the frame boundary, resulting in packet reception failure. FIG. 2a shows that correlated results serve as a good indication in frame synchronization when transmitting a single stream. However, use of correlated results only may lead to an ambiguous frame boundary when transmitting multiple streams that are cyclic shifted to each other. FIG. 2b shows 2 spatial streams conducts multiple peaks in the correlated results, thus, the system fails to identify which is the true frame boundary. In addition to cyclic shift effects, multi-path interference will also make the detection more difficult. For example, the correlated results shown in FIG. 2b could be the correlated result of a single spatial stream system with multi-path effects. Thus, systems applying correlation to determine frame boundaries for frame synchronization may easily get failed when transmitting cyclic shift multiple streams.

BRIEF SUMMARY OF THE INVENTION

Accordingly, the invention provides frame synchronization methods and apparatuses for wireless communication systems with cyclic shift spatial streams.

In one aspect of the invention, a frame synchronization method comprises correlating a stream with a pattern to generate a correlated result c(t). A first peak and a second peak are selected from the correlated result c(t), wherein the first peak is the peak with the highest amplitude, and the second peak is the peak that occurs later than the first peak and has the second highest amplitude. A ratio of the two peaks is computed, and the position of the frame boundary is determined according to the ratio.

In another aspect of the invention, a receiver for detecting a frame boundary comprises a correlator, a peak selector, and an interpolator. The correlator receives a stream and correlates the stream with a packet pattern to generate a correlated result c(t). The peak selector selects a first peak and a second peak from the c(t), wherein the first peak is the peak with highest amplitude, and the second peak is the peak occurs latter than the first peak and has a second highest amplitude. The interpolator interpolates between the position of the first peak and the position of the second peak to generate the frame boundary.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

FIG. 1 shows that the 802.11n protocol implementing cyclic shift in different transmitting spatial streams;

DETAILED DESCRIPTION OF THE INVENTION

Figure 2A:
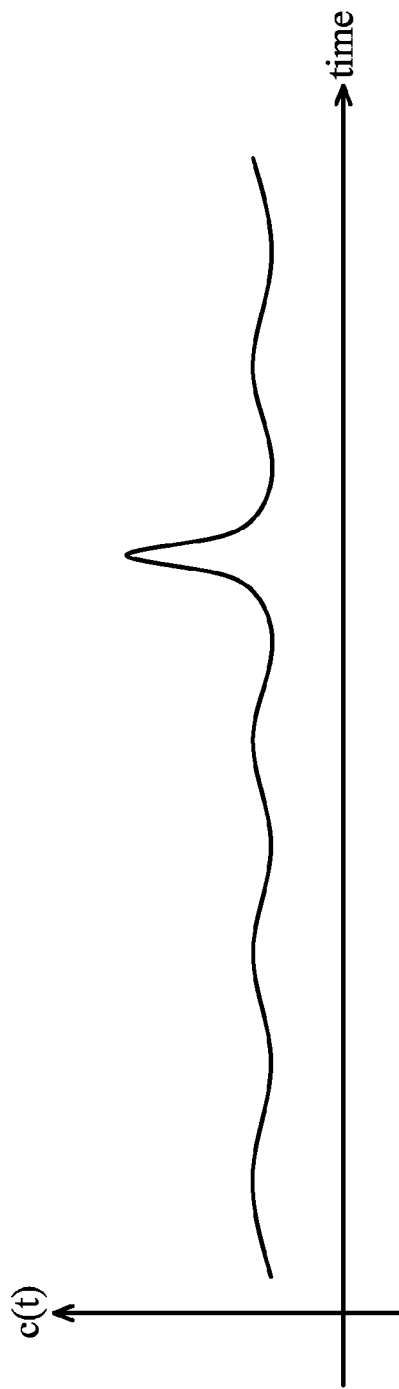
FIG. 2a shows that correlated results serve as a good indication in frame synchronization when transmitting single stream.
Figure 2B:
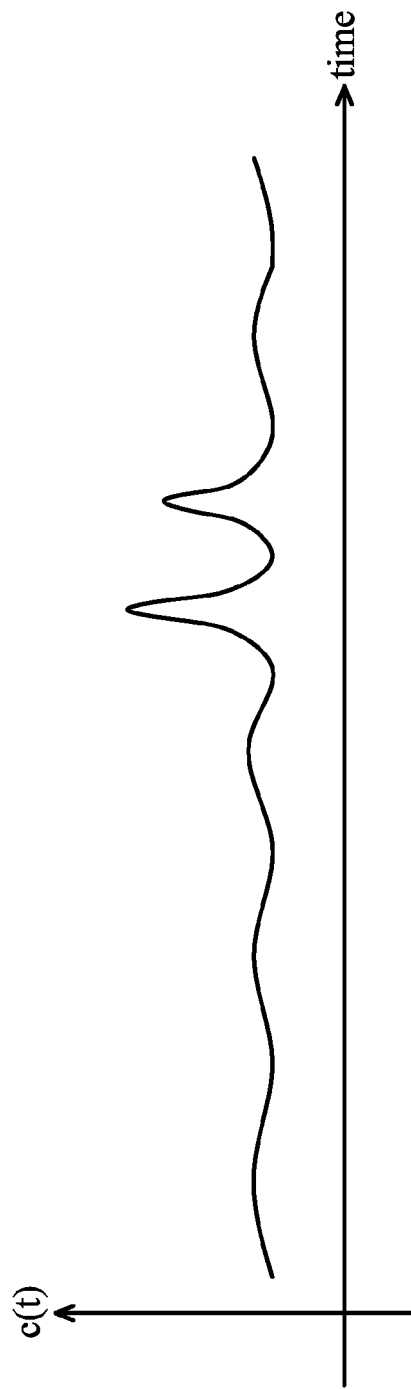
FIG. 2b shows 2 spatial streams conducts multiple peaks in the correlated results.
Figure 3:
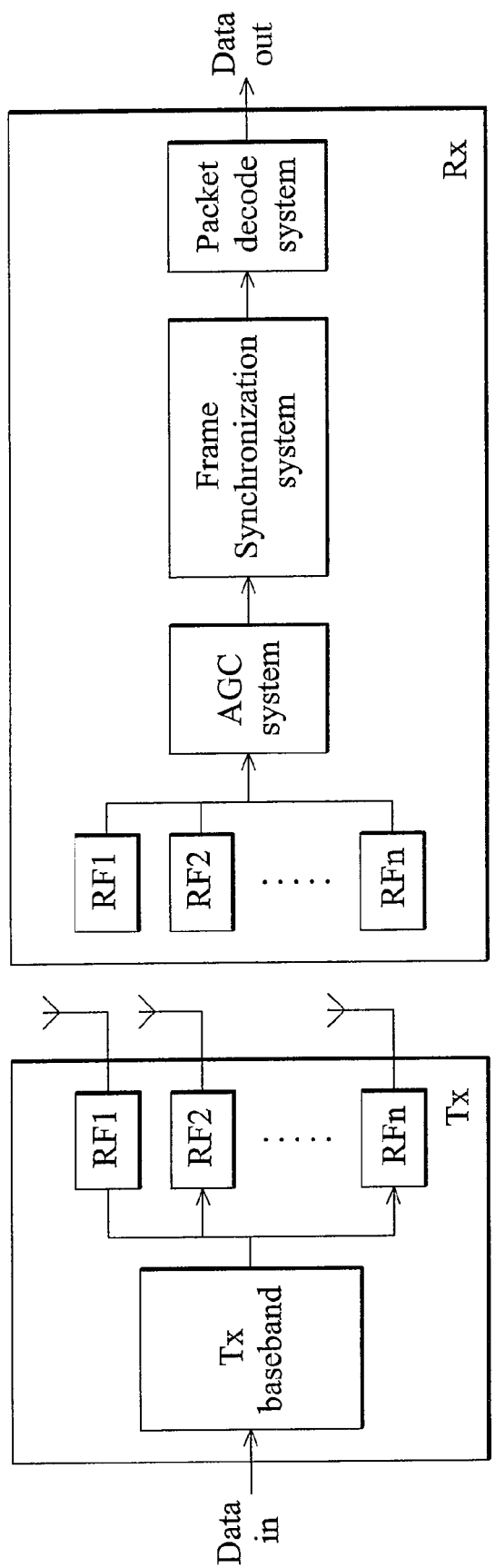
FIG. 3 shows a block diagram of a MIMO wireless communication system.
Figure 4A:
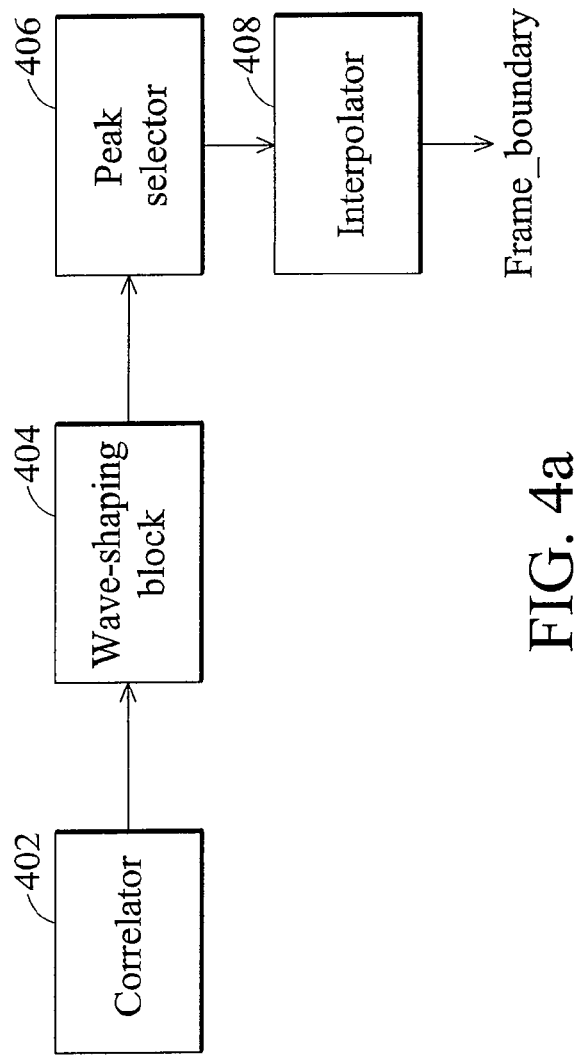
FIGS. 4a and 4b show systems for detecting frame boundary according to several embodiments of the invention.
Figure 4B:
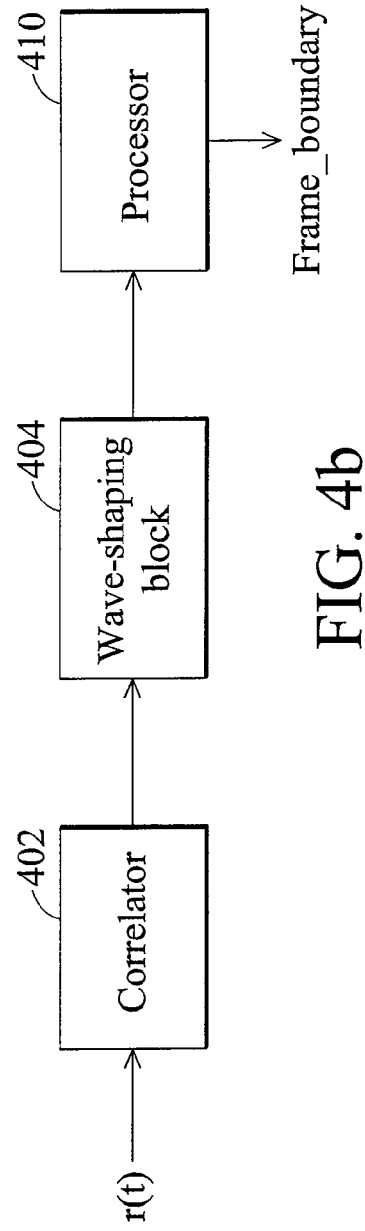
Figure 5:
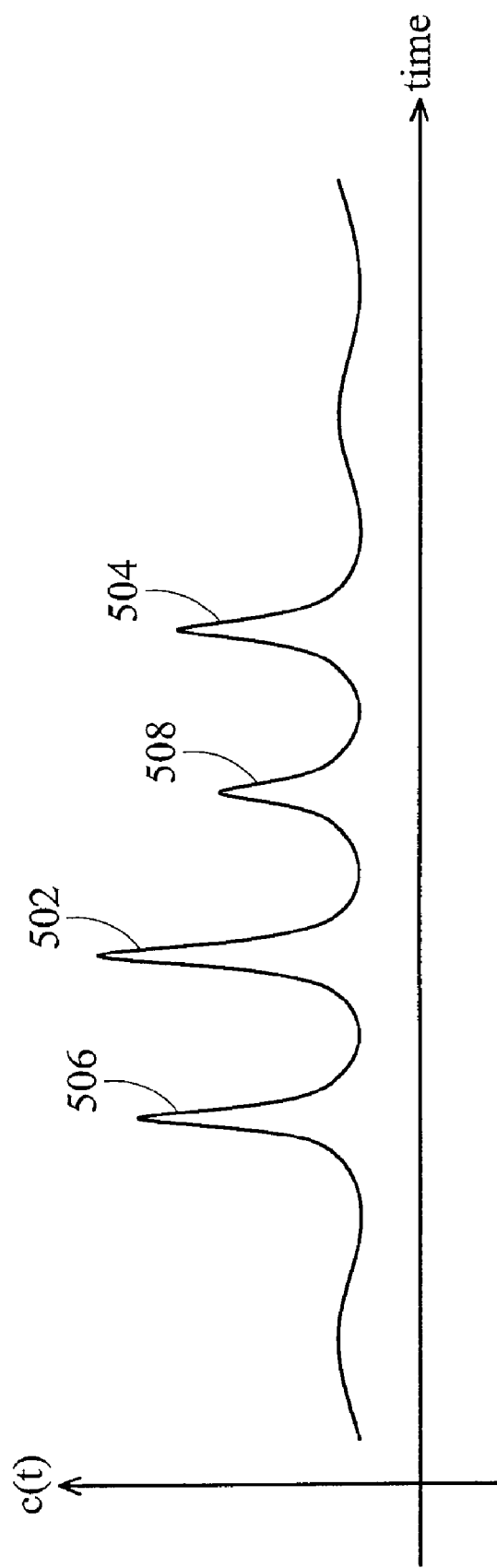
FIG. 5 shows 4 peaks with different peak values.

FIG. 3 shows a block diagram of a MIMO wireless communication system. A transmitter with n antennas transmits n spatial streams. The receiver comprises a plurality of radio frequency (RF) module receiving RF streams by n antennas, an automatic gain control (AGC) module to adjust the gain of each RF stream, a frame synchronization system and a packet decoding system. The frame synchronization system locates the frame boundary of each packet frame so that the succeeding packet decoding system can continually handle the packet contents. FIG. 4a shows a block diagram of the frame synchronization system according to an embodiment of the invention. The system comprises a correlator 402, a wave-shaping block 404, a peak selector 406, and an interpolator 408. The correlator 402 receives a stream r(t), and cross-correlates the stream r(t) with a packet pattern. In other embodiments, the correlator 402 can auto-correlate the stream r(t) to form the correlated result. In the preferred embodiments, the packet pattern is a Guard Interval (GI) pattern. The correlated result c(t) is sent to the wave-shaping block 404 to enhance the wave power concentrations. The wave-shaping block 404, in some embodiments, is a low-pass filter (LPF). The enhanced c(t) is sent to a peak selector 406 The peak selector 406 selects a first peak and a second peak from the enhanced c(t), wherein the first peak is the peak with the highest amplitude, and the second peak is the peak latter than the first peak and has a second highest amplitude. For example, FIG. 5 shows 4 peaks with different peak values. Peak 502 has a maximum peak value, thus peak 502 is selected as the first peak. Among the peaks occurred after the peak 502, peak 504 has the highest peak value. Hence peak 504 is selected as the second peak. The peak selector 406 may selects peaks within a G. I. window, where the G.I. window is a period starting when the received stream r(t) is about to become guard interval, and ending when the guard interval has ended. The interpolator 408 interpolates the position of the first peak and the second peak to generate the frame boundary. The interpolating equation utilized by the interpolator 408 may vary with working environments. In some embodiments, the peak selector 406 and the interpolator 408 can be merged to a processor 410, as shown in FIG. 4b.

In some embodiments, the interpolator utilizes the following equation to generate the frame boundary:

$$\text{frame boundary} = (\text{position of the first peak} * x)^a + (\text{position of the second peak} * y)^b,$$

wherein the parameters a and b are positive values. In some cases, the interpolator is a linear interpolator, which means the parameters a and b are 1 s, and x+y makes 1. The interpolator 408 sets (x,y) to a set #1 when the ratio of the second peak over the first peak exceeds a threshold #1. If the ratio of the second peak over the first peak is less than the threshold #1 and exceeds a threshold #2, the interpolator 408 further sets (x,y) to a set #2. In general, the interpolator 408 sets (x,y) to a set #n when the ratio of the second peak over the first peak exceeds a threshold #n and is less than a threshold #(n−1), and the interpolator 408 sets (x,y) to a set #(n+1) when the ratio of the second peak over the first peak is less than the threshold #n. The threshold #1 is the smallest one among all the thresholds. The threshold #2 is less than the threshold #3, and exceeds the threshold #1, the threshold #(n−1) is less than the threshold #n and exceeds the threshold #(n−2), and so on. The thresholds are all programmable numbers and can be adjusted according to the environment and RF characteristics.

FIGS. 7a-7d show an embodiment of finding frame boundary with n equals to 3. In the embodiment, n is set to 3. FIGS. 7a, 7b, 7c, and 7d show that the ratios of the second peak over the first peak is respectively less than a first threshold, a second threshold, a third threshold, and a fourth threshold.

Figure 6:
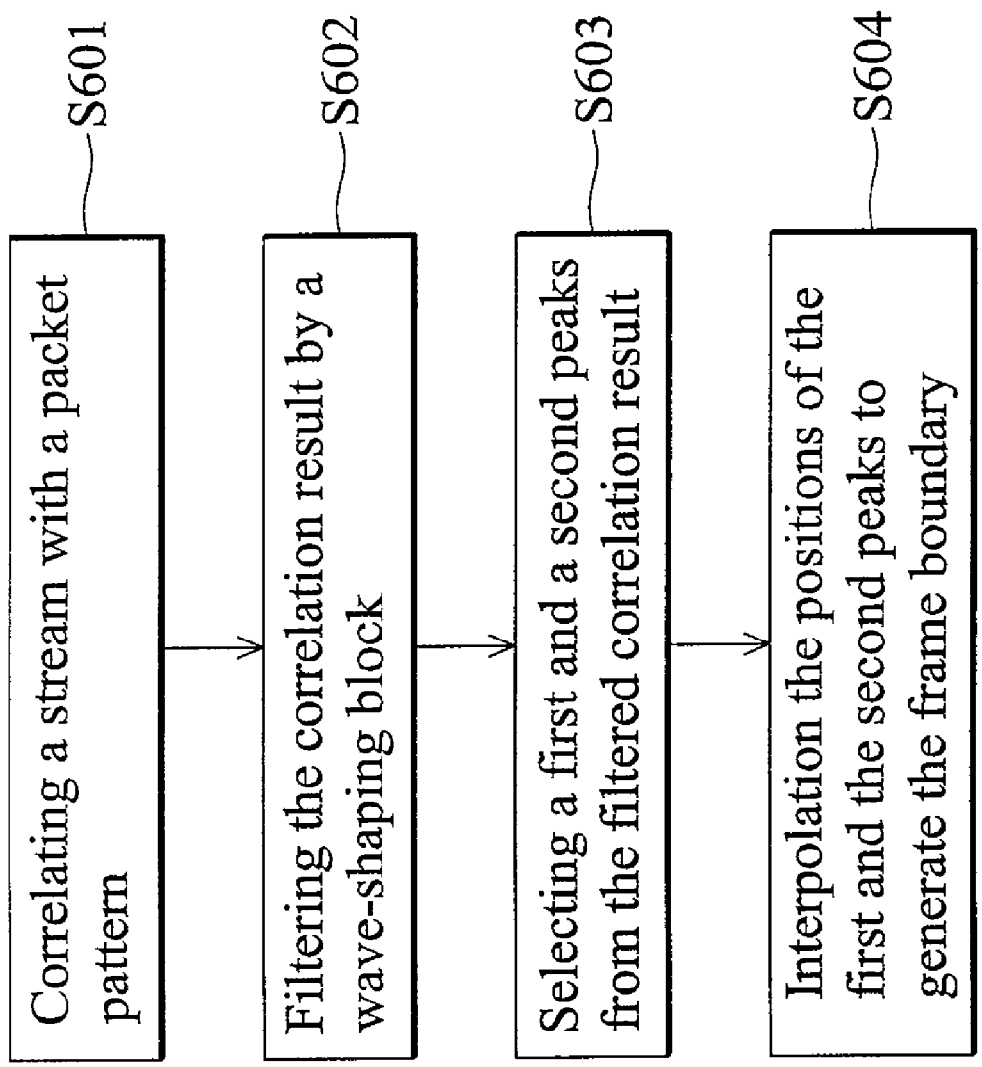
FIG. 6 shows a flowchart of a frame synchronization method according to an embodiment of the invention.
Figure 7B:
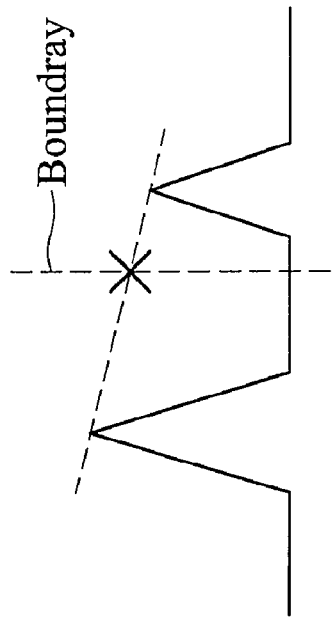
FIGS. 7a-7d show an embodiment of finding frame boundary with n equals to 3.
Figure 7D:
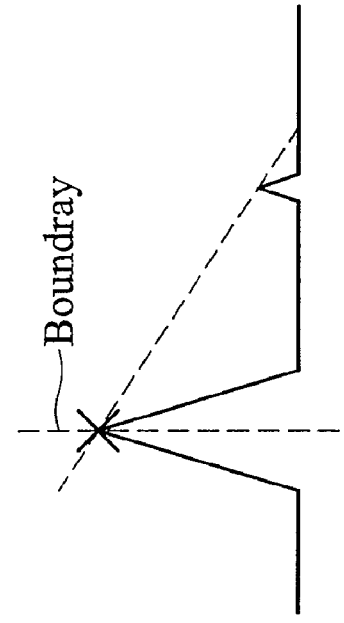
Figure 7A:
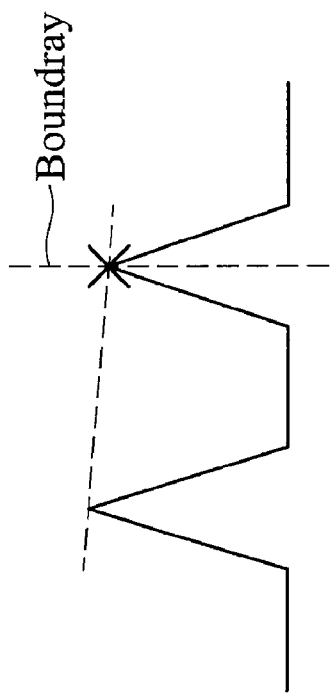
Figure 7C:
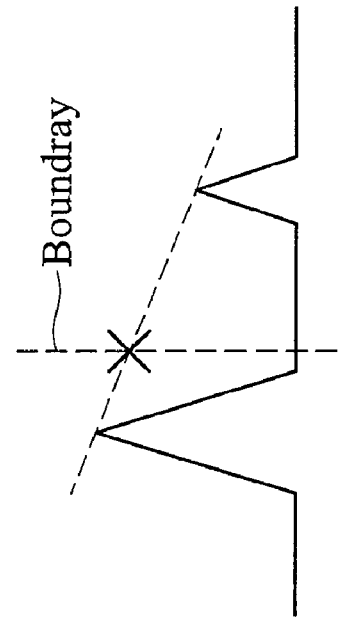

FIG. 6 shows a flowchart of another embodiment of a method for detecting frame boundary. The method comprises cross correlating a stream r(t) with a packet pattern in step 601. A low-pass filter filters the correlated result c(t) in step 602. A first peak and a second peak are selected from the filtered correlated result c'(t) in step 603. The first peak is a peak with the highest amplitude, and the second peak, occurring after the first peak, is the peak with the second highest amplitude. The frame boundary is generated by interpolating the positions of first and second peaks. The interpolating equation is similar to that utilized by interpolator 408, hence description thereof is omitted here for brevity.

The system is advantageous in that performance MIMO system performance is greatly enhanced. With small increments in complexity, the system may achieve better timing synchronization and thus improve system performance. From the simulation, it was shown that the proposed technique can achieve almost the same PER (packet error rate) performance as the perfect synchronization in the IEEE standard channels B and D environment. For the more severe multi-path channel E, the disclosed system suffers less than 1 dB degradation when compared with the perfect frame synchronization system.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A frame synchronization method, comprising:
   correlating a stream with a pattern to generate a correlated result c(t);
   selecting a first peak and a second peak from the correlated result c(t), wherein the first peak is the peak with highest amplitude, and the second peak is the peak occurring later than the first peak, with the second highest amplitude;
   comparing a ratio of the second peak over the first peak; and
   determining the position of a frame boundary of the stream according to the ratio.

2. The frame synchronization method as claimed in claim 1, further comprising filtering the correlated result c(t) by a low-pass filter before selecting the first peak and the second peak.

3. The frame synchronization method as claimed in claim 1, wherein the step of determining the position of the frame boundary further comprises applying the following equation to generate the frame boundary:
   $$\text{frame boundary} = (\text{first position} * x)^a + (\text{second position} * y)^b,$$
   wherein the parameters a and b are positive values, the mathematical sign * represents a multiplication, and parameters x and y comprise a parameter set (x,y).

4. The frame synchronization method as claimed in claim 3, wherein the frame boundary is generated by a linear interpolator, and the parameters a and b are 1 s.

5. The frame synchronization method as claimed in claim 3, further comprising:
   setting the parameter set (x,y) to a first set when the ratio exceeds a first threshold;
   setting the parameter set (x,y) to a second set when the ratio exceeds a second threshold and is less than the first threshold;
   setting the parameter set (x,y) to a nth set when the ratio exceeds a nth threshold and is less than a (n−1)th threshold; and
   setting the parameter set (x,y) to a (n+1)th set when the ratio is less than the nth threshold.

6. A receiver for detecting frame boundary, comprising:
   a correlator receiving a stream and correlating the stream with a packet pattern to generate a correlated result c(t);
   a peak selector selecting a first peak and a second peak from the correlated result c(t), wherein the first peak is the peak with the highest amplitude, and the second peak is the peak occurring after the first peak, with the second highest amplitude, and
   an interpolator interpolating a first position of the first peak and a second position of the second peak to generate the frame boundary of the stream.

7. The receiver for detecting frame boundary as claimed in claim 6, wherein the interpolator applies the following equation to generate the frame boundary:
   $$\text{frame boundary} = (\text{first position} * x)^a + (\text{second position} * y)^b,$$
   wherein the parameters a and b are positive values, the mathematical sign * represents a multiplication, and parameters x and y comprise a parameter set (x,y).

8. The receiver for detecting frame boundary as claimed in claim 7, wherein the interpolator is a linear interpolator, and the parameters a and b are 1 s.

9. The receiver for detecting frame boundary as claimed in claim 8, wherein the interpolator sets the parameter set (x,y)

to a first set when the ratio of the second peak over the first peak exceeds a first threshold, the interpolator further sets the parameter set (x,y) to a second set when the ratio of the second peak over the first peak exceeds a second threshold and is less than the first threshold, the interpolator further sets the parameter set (x,y) to a $n^{th}$ set when the ratio of the second peak over the first peak exceeds a $n^{th}$ threshold and is less than a $(n-1)^{th}$ threshold, and the interpolator further sets the parameter set (x,y) to a $(n+1)^{th}$ set when the ratio of the second peak over the first peak is less than the $n^{th}$ threshold.

10. The receiver for detecting frame boundary as claimed in claim 6, further comprising a wave-shaping block enhancing a plurality of wave crests and a plurality of wave troughs of the correlated result c(t), and the peak selector selects peaks according to an enhanced correlated result c(t).

11. The receiver for detecting frame boundary as claimed in claim 10, wherein the wave-shaping block is a low-pass filter.

12. The receiver for detecting frame boundary as claimed in claim 6, wherein the peak selector and the interpolator are implemented by a processor.

* * * * *